(12) United States Patent
Lai

(10) Patent No.: US 12,437,217 B2
(45) Date of Patent: Oct. 7, 2025

(54) SYSTEM AND METHOD FOR NON-DESTRUCTIVE RAPID FOOD PROFILING USING ARTIFICIAL INTELLIGENCE

(71) Applicant: PROFILEPRINT PTE. LTD., Singapore (SG)

(72) Inventor: Woon Siong Alan Lai, Singapore (SG)

(73) Assignee: PROFILEPRINT PTE. LTD., Singapore (SG)

( * ) Notice: Subject to any disclaimer, the term of this patent is extended or adjusted under 35 U.S.C. 154(b) by 771 days.

(21) Appl. No.: 17/781,786

(22) PCT Filed: Dec. 1, 2020

(86) PCT No.: PCT/SG2020/050708
§ 371 (c)(1),
(2) Date: Jun. 2, 2022

(87) PCT Pub. No.: WO2021/112762
PCT Pub. Date: Jun. 10, 2021

(65) Prior Publication Data
US 2023/0029413 A1    Jan. 26, 2023

(30) Foreign Application Priority Data

Dec. 4, 2019 (SG) ............... 10201911636P

(51) Int. Cl.
*G06N 3/00* (2023.01)
*G06N 5/022* (2023.01)
(Continued)

(52) U.S. Cl.
CPC ............ *G06N 5/04* (2013.01); *G06N 5/022* (2013.01)

(58) Field of Classification Search
CPC ................. G06N 5/04; G06N 5/022
(Continued)

(56) References Cited

U.S. PATENT DOCUMENTS 6,512,577 B1 * 1/2003 Ozanich ............... G01J 3/0224
356/402
8,988,683 B2 * 3/2015 Urushidani .......... G01N 21/359
356/402
(Continued)

FOREIGN PATENT DOCUMENTS

CN    106560697 A    4/2017
CN    108760655 A    11/2018
(Continued)

OTHER PUBLICATIONS

"Can artificial intelligence conquer the human tongue? Introducing 'AI taste' services from chocolate development to recipe suggestions", Ledge.ai, [online], [Search Date: Feb. 21, 2024], Dec. 7, 2018, Internet <URL: https://ledge.a i/articles/ai-taste-examples>.
(Continued)

*Primary Examiner* — Pavan Mamillapalli
(74) *Attorney, Agent, or Firm* — BakerHostetler

(57) ABSTRACT

A system and method for non-destructive food rapid profiling in terms of taste, variant classification, adulteration, etc., using artificial intelligence. The system includes: a receptacle configured to move a non-homogenized sample in a path to intersect a volumetric sampling space; a sensor configured to sense reflectance from at least a part of the sample in the volumetric sampling space, the sensor being configured to output a component of the reflectance as captured data, the captured data being characterised by an overtone spectrum over a range of wavelengths; and a computing device configured to apply at least one first machine learning model to the captured data to: predict at least one facet corresponding to predictively determined
(Continued)

selected wavelengths; and provide a signature data using the at least one facet.

20 Claims, 12 Drawing Sheets

(51) Int. Cl.
*G06N 5/04* (2023.01)
*G06N 7/00* (2023.01)

(58) Field of Classification Search
USPC .......................................................... 706/12
See application file for complete search history.

(56) References Cited

U.S. PATENT DOCUMENTS

| | | | | |
|---|---|---|---|---|
| 10,810,408 | B2* | 10/2020 | Hsiung | G06F 18/2433 |
| 12,285,032 | B2* | 4/2025 | Konishi | C13B 50/00 |
| 2006/0179022 | A1* | 8/2006 | Holland | G06N 3/004 |
| | | | | 706/45 |
| 2015/0290795 | A1* | 10/2015 | Oleynik | B25J 9/0081 |
| | | | | 700/257 |
| 2016/0034764 | A1* | 2/2016 | Connor | G06V 20/52 |
| | | | | 348/158 |
| 2017/0010210 | A1* | 1/2017 | Choung | G01N 21/274 |
| 2017/0199952 | A1* | 7/2017 | Kim | G01N 33/0098 |
| 2019/0362263 | A1* | 11/2019 | Harris | G06N 5/04 |
| 2020/0030971 | A1* | 1/2020 | Oleynik | B25J 9/163 |
| 2021/0037863 | A1* | 2/2021 | Pichara | G06F 18/2431 |
| 2021/0199371 | A1* | 7/2021 | Han | G06V 10/255 |

FOREIGN PATENT DOCUMENTS

| | | |
|---|---|---|
| CN | 108960315 A | 12/2018 |
| CN | 109115708 A | 1/2019 |
| CN | 109959653 A | 7/2019 |
| JP | 63-235849 A | 9/1988 |
| JP | 2000-111505 A | 4/2000 |
| JP | 2013-127376 A | 6/2013 |
| WO | 01/69191 A1 | 9/2001 |
| WO | 2018/084612 A1 | 5/2018 |

OTHER PUBLICATIONS

Kang et al, Overview and study on the method of fruits detection technology based on machine vision, Ningxia Engineering Technology, Jun. 15, 2010, vol. 9, No. 2, pp. 166-169, 173.
Wikipedia: Near-infrared spectroscopy. Jul. 2, 2010 [Retrieved on Feb. 16, 2021 from https://web.archive.org/web/20100702031649/ https://en.wikipedia.org/wiki/Near-infrared_spectroscopy].

* cited by examiner

SYSTEM AND METHOD FOR NON-DESTRUCTIVE RAPID FOOD PROFILING USING ARTIFICIAL INTELLIGENCE

CROSS-REFERENCE TO RELATED APPLICATIONS

This application is the National Stage of International Patent Application No. PCT/SG2020/050708, filed Dec. 1, 2020, which claims the benefit of Singapore patent Application Number 10201911636P, filed Dec. 4, 2019, the disclosures of which are incorporated herein by reference in their entireties.

TECHNICAL FIELD

The present application relates to a system and method using artificial intelligence, and more specifically to a system and method using machine learning for non-destructive rapid food analysis at a molecular level.

BACKGROUND

Consumers and regulatory authorities expect a consistent and reliable food product from manufacturers/suppliers. However, due to the nature of agricultural and farm products, such consistency is difficult to achieve as the products have intrinsic variations as a result of different cultivars, terroir, altitudes, preparation methods, etc. Even products grown at a single location may exhibit differences in properties due to seasonality, climate changes, and quality of soil. These difficulties may be compounded by the blending of multiple cultivars, which is often performed to try to compensate for such variations. There have been attempts by manufacturers to improve the efficiency of measuring characteristics of food products, for example, by using gas chromatography, electronic tongues which operate based on electro-potentiometric differences or by using mass spectrometry. Unfortunately, these approaches require destroying the sample being tested and long processing lead time. In practice, food manufacturers/suppliers commonly end up relying on the human experts to visually inspect, physically touch, and taste the products.

SUMMARY

According to one aspect, there is provided a portable apparatus and a system for non-destructive taste profiling of a food, the system including: a portable apparatus including: a receptacle configured to move a sample in a volumetric sampling space, in which the sample includes the food in a non-homogenized form; a source configured to direct light towards the volumetric sampling space; an optical device having an input port and an output port, the input port being configured to sense reflectance from at least a part of the sample in the volumetric sampling space, the optical device being configured to output a component of the reflectance through the output port; and a detector coupled to the output port, the detector being configured to convert the component of the reflectance into captured data, the captured data being characterized by an overtone spectrum; and a computing device coupled to the detector, the computing device being configured to: apply at least one first machine learning model to the captured data to predict at least one facet corresponding to at least one selected wavelength from the overtone spectrum; and provide a signature data characteristic of the food using a plurality of the at least one facet.

According to another aspect, there is a system for non-destructive profiling of a sample of a food, the system including: a receptacle configured to move the sample in a path so as to intersect a volumetric sampling space, the sample being in a non-homogenized form; a sensor configured to sense reflectance from at least a part of the sample in the volumetric sampling space, the sensor being configured to output a component of the reflectance as captured data, the captured data being characterised by an overtone spectrum over a range of wavelengths; and a computing device configured to apply at least one first machine learning model to the captured data to: predictively determine selected wavelengths from the range of wavelengths; predict at least one facet corresponding to the selected wavelengths; and provide a signature data using the at least one facet.

In any of the above systems, the computing device may be further configured to apply at least one second machine learning model to the signature data to: predict at least one descriptor; and provide a signature characteristic of the tea using the at least one descriptor.

According to another aspect, there is provided a method of non-destructive taste profiling of a sample of a food, the method comprising: providing captured data to a computing device, the captured data being characterised by an overtone spectrum of a measure of a reflectance over a range of wavelengths, wherein the reflectance is sensed from at least a part of the sample in a volumetric sampling space, the sample including non-homogenized food; predicting at least one facet by applying at least one first machine learning model to the captured data, wherein the at least one facet corresponds to at least one selected wavelength predictively determined from the range of wavelengths; and using the at least one facet to provide a signature data characteristic of the sample.

The above method may further include: applying at least one second machine learning model to the signature data, wherein the at least one second machine learning model is configured to: predict at least one descriptor; and provide the signature of the food using at least one descriptor. The method may further include: predicting a blend intended to have a taste associated with the food, wherein the blend has a composition of ingredients different from a composition of the food. The method may further include: applying a second machine learning model to the signature data, wherein the second machine learning model is at least one selected from a group consisting of: a taste profile prediction module, a variety prediction module, a blend configuration module, an adulteration detection module, and a food grade/quality control module, and a nutritional analysis module.

These and other aspects of the embodiments will be further described in following description and appended drawings.

DETAILED DESCRIPTION

Figure 1:
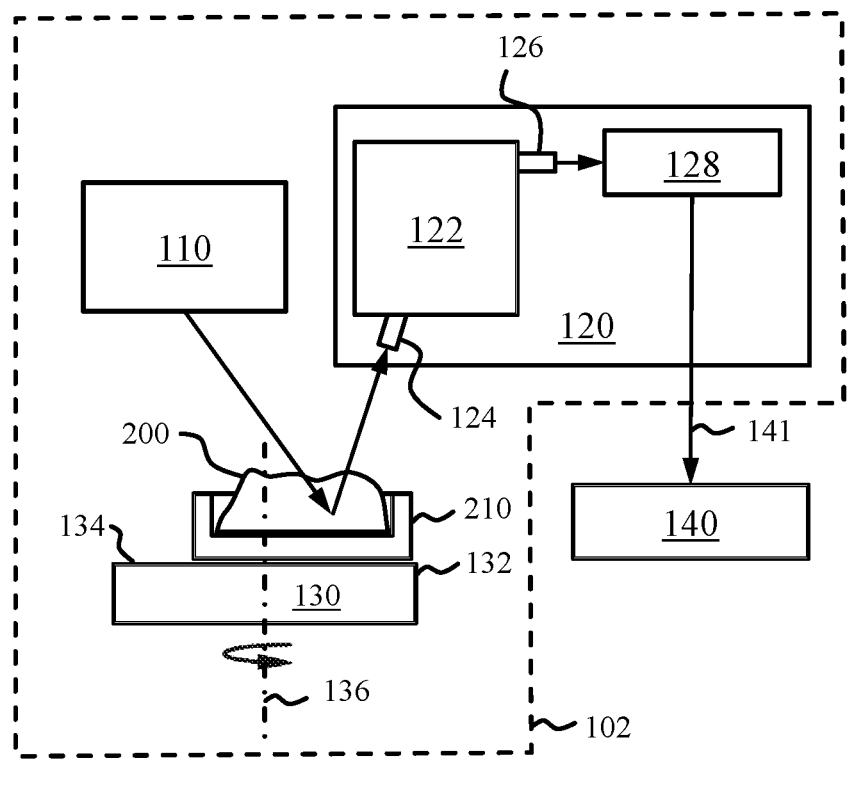
FIG. 1 is a schematic diagram of a system according to one embodiment.

It will be readily understood that parts of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment. As used herein, the singular "a" and "an" may be construed as including the plural "one or more" unless clearly indicated otherwise.

Furthermore, the described features, structures, or characteristics may be combined in any suitable manner in one or more embodiments. In the following description, numerous specific details are provided to give a thorough understanding of embodiments. One skilled in the relevant art will recognize, that the various embodiments be practiced without one or more of the specific details, or with other methods, constituents, materials, etc. In other instances, some or all known structures, materials, or operations may not be shown or described in detail to avoid obfuscation.

A system and method using machine learning for material analysis at a molecular level will be described with reference to FIG. 1 to illustrate non-destructive rapid taste profiling using tea leaves as an example. The term "taste profiling" as used in this document refers to providing a profile of a food or a food product based on at least one type of richer information such as tastes, origins, provenances, cultivars, etc., and the term is not to be confused with a method to produce an outline or contour of a physical shape of an object.

The system 100 includes an apparatus 102 in which is provided a source 110 of light (electromagnetic radiation) and a sensor 120. The sensor may be one suitable for sensing light at wavelengths commonly referred to as visible-to-near infra-red (VIS-NIR) light. Alternatively, the sensor may be one suitable for sensing light at a wider range of wavelengths. Alternatively, the sensor may be one suitable for use with the selected source. The source is configurable to direct light towards a receptacle 130. The source, the receptacle, and the sensor may be disposed in the apparatus with a housing suitable for reducing extraneous light from being picked up by the sensor. In contrast to a typical set-up for nuclear magnetic resonance, the housing for a system of FIG. 1 may be sized and configured to facilitate portability or movement from one place to another. The rotatable receptacle, the source, and the sensor may form part of a portable apparatus. Thus, embodiments of the present disclosure are suitable for use "on-site" if so desired. The sensor may be coupled to a computing device 140. The computing device may be provided as part of the apparatus 102 or as a separate device configured to receive data/signals output from the sensor (as shown). The computing device may be coupled to a memory/storage provided as part of the computing device or provided over a network connection.

The receptacle 130 may be disposed in the apparatus 102 with the receptacle in turn configured to receive or support a sample 200 for testing (also referred to as a test sample). In this example, the receptacle is an essentially flat disk without a raised edge around its circumference or side 132. Such a receptacle is suitable for directly disposing a non-fluid sample on a surface 134 of the receptacle. At the same time, disposing a sample on the receptacle can include providing the sample in a cup 210 and disposing the cup on the receptacle. The term "cup" is used to refer generally to a vessel, which may come in a range of different shapes and sizes, suitable for holding and/or transporting the sample. Using a cup to hold the sample may be useful when the sample is at least partially fluid, or when the sample is in a powder form. In an example where the sample is an amount of dried tea leaves, the sample can be directly disposed on the receptacle without a cup. Alternatively, the dried tea leaves can be disposed in a cup, and the cup can be placed on or otherwise received by the receptacle.

Figure 2A:
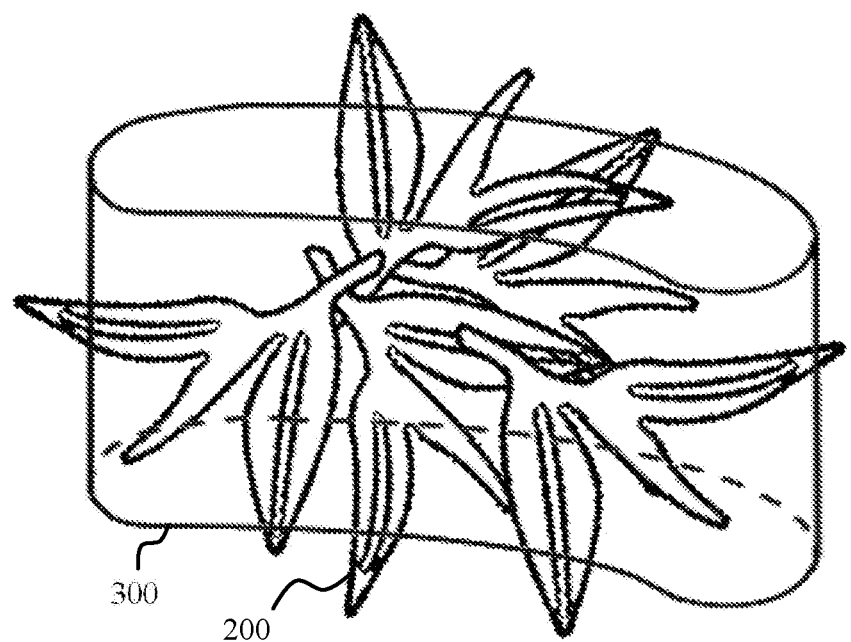
FIG. 2A and FIG. 2B illustrate examples of a volumetric sampling space for data capture.
Figure 2B:
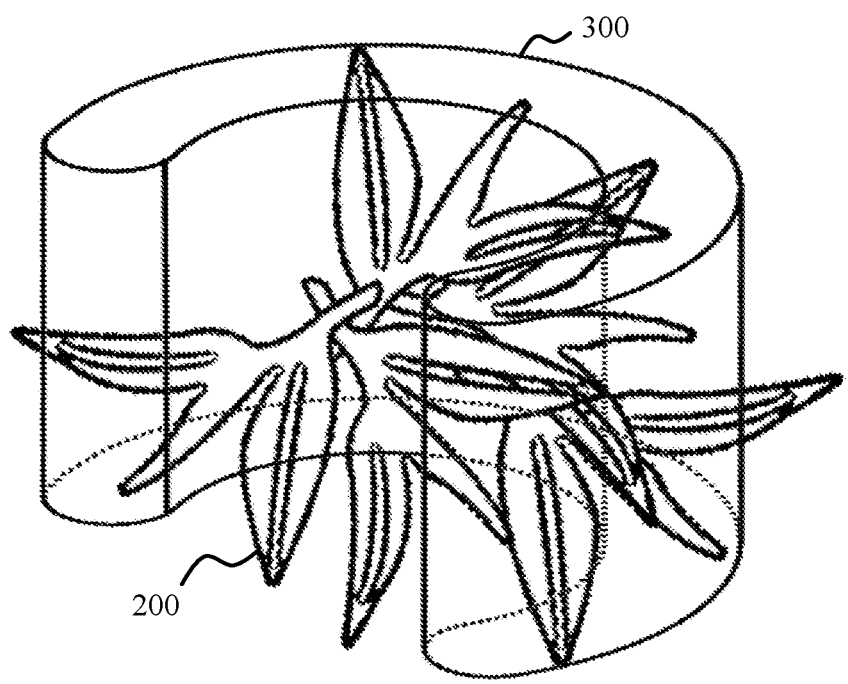

The system of FIG. 1 is further configured such that the receptacle is rotatable about an axis of rotation 136. As the receptacle is rotated about the axis, the sample will be displaced relative to the source and/or sensor. The relative movement between the sample and the source and/or the sensor provide different surfaces of the sample to light coming from the source. Light would be expected to fall on different surfaces of the sample at different angles. Light reflected off the sample and sensed by the sensor would also be expected to vary with the relative movement between the sample and the source and/or the sensor. The variations can be amplified by positioning the cup in an offset position so that the cup is not substantially coaxial with the axis of rotation of the receptacle. Counter-intuitively, it is not required to precisely position the sample relative to the source and/or sensor in order to achieve a high degree of repeatability. To illustrate, the cup may be positioned at an offset relative to the receptacle, and the offset may be of a different amount from one test to another. FIGS. 2A and 2B illustrate schematically that when the sample is in relative motion to the source and/or sensor, the incident light on the sample traces a path on the sample such that the data capture is from a region, rather than a precisely targeted spot. The data capture in this case includes reflectance contributed by molecules beneath the "surface" of the sample. That is to say, the region from which data is captured includes a depth dimension. The data capturing process according to embodiments of the present disclosure can thus be described as a volumetric data capture, in contrast to a spot data capture or a line data capture. The receptacle is configured to move relative to the source and/or the optical device/sensor to define a volumetric sampling space. The source, receptacle, and the sensor may be adapted so that at least part of the sample is disposed in the volumetric sampling space when there is relative motion between at least two of these elements. In other words, the sample may be moved relative to the volumetric sampling space. The system of FIG. 1 is an example of providing captured data from a volumetric sampling space 300 (FIGS. 2A, 2B), described to aid understanding and not intended to be limiting. For the sake of brevity, each set of movement bringing the incident light and/or sample through a designated path without retracing a previously traversed path is referred to as one scan. In one example, one scan will be completed in one complete revolution of the receptacle. It has been found that as few as one scan can be enough to provide the captured data for predicting a signature of the food. In some embodiments, one scan can be completed in as little as 3 seconds. A signature (e.g. taste signature) characteristic of a food (e.g., tea) can be output by the system in about 5 seconds from initiating rotation of the receptacle.

In one example, as shown in FIG. 1. the sensor 120 includes an optical device 122 and a detector 128. The optical device is configured to receive light reflected (reflectance) from the sample 200 and to output light to the detector. The detector is configured to indirectly receive light reflected by the sample. The optical device is configured to receive scattered, divergent, or diffused light reflected by the sample. The optical device may be described as a device configured to provide further diffuse reflection of the light received. The optical device may be described as a device configured to provide multiple diffuse reflection of the light received. The optical device may be described as a device configured to amplify the light received. The optical device is configured to output a component of the light received to the detector. The detector is configured to convert light output from the optical device into data/electrical energy receivable by the computing device.

The optical device may be described as having an input port 124 and an output port 126. The input port is orientated towards the receptacle 130 so as to sense reflectance or receive light reflected by what is disposed on the receptacle. The optical device, or more specifically the input port, is configured to sense reflectance or receive light that is reflected from the sample disposed on the receptacle. As illustrated schematically by FIG. 1, the system 100 is configured to provide a source 110, a receptacle 130, and the optical device 120 in a physical arrangement suitable for light to travel a direct path from the source to the sample 200 (or the receptable where a sample may be disposed) before being reflected and received into the optical device through the input port 124. The optical device 120 is configured to remove spatial information from the light received through the input port 124, and to output a component of the light through the output port 126. The optical device may be described as a device configured to remove spatial information from its input such that its output is without spatial information. The optical device may be described as a device configured to extract non-spatial information from an input such that its output is a component or a measure of the input, or in other words, a linear component or a magnitude of the input. The optical device may include, e.g., an integrating sphere, a goniophotometer, a focusing sphere, a Coblentz sphere, or similar devices to receive scattered, divergent, or diffused light, and to output a linear component of the received light. Conceivably, the optical device may alternatively be in the form of metasurfaces, or as a device integrated with the detector, etc.

Using dried tea leaves as a sample helps to illustrate the utility of the system and method in analysing non-homogenized (also referred to as non-homogenous) articles in the solid state, even when the articles are randomly disposed in various orientations in three-dimensional space. In the case of articles such as tea leaves that are ready for use in brewing, non-homogeneity presents challenges. Each tea leaf is intrinsically unique, and when dried, the tea leaves can take on different shapes and configurations, but often without visible characteristics for distinguishing the taste of one tea from another. This is unlike the case where non-homogeneity of the appearance of plant parts is used to identify a stage of growth of a plant part. For example, fresh plant parts at different stages of growth may be recognized by identifying visible characteristics (such as the presence or absence of a bud or a leaf). Using conventional visual inspection, this means that the fresh plant parts must be laid out with no relevant parts concealed in order to facilitate identification.

Figure 3:
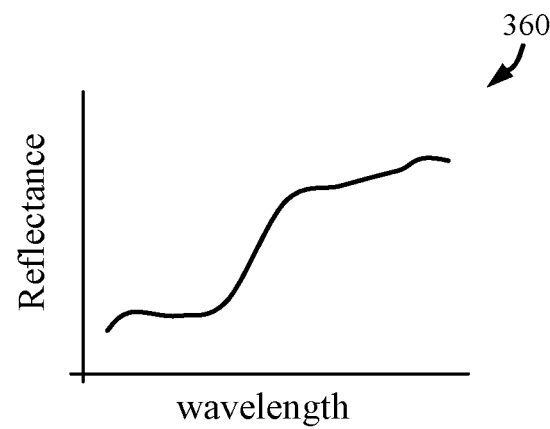
FIG. 3 illustrates an overtone spectrum with seemingly no distinguishing peak.

The spectrum characteristic of data obtainable for a non-homogenized sample can be described as an overtone spectrum. An overtone spectrum is characterized by a lack of distinct or sharp peaks. An overtone spectrum is characterized by gradual changes in intensity (in this case, the reflectance) over a range of wavelengths. FIG. 3 illustrates an example of an overtone spectrum 360 to aid understanding. According to the embodiment of FIG. 1, the system is configured to provide irradiation (by the source) on multiple points (surfaces) of the sample. This would be expected to generate a "noisier" spectrum or a spectrum with a larger degree of overtone, and typically deemed undesirable for repeatability as well as rapid and accurate determination of a molecular signature of a sample.

The resulting spectrum would be expected to be a seemingly "noisy" and "characterless" spectrum or a spectrum with a larger degree of overtone, as compared to a spectrum obtained by FTIR (Fourier Transform Infrared) spectroscopy, mass spectrometry or NMR (nuclear magnetic resonance). "Noise" may include fluctuations of the data/signals which occurs even when the sample is of the same molecular composition. The overtone spectrum obtainable may include fluctuations in the distribution of the data/signals over wavelength, as well as fluctuations in the absolute light intensity measured, at least partially as a result of the non-homogenized nature of the physical aspects of the sample, and/or the diffuse nature of the light reflected by the sample. The molecular signature of the sample cannot be easily extracted from an overtone spectrum using a simple filter to filter out noise.

Figure 4:
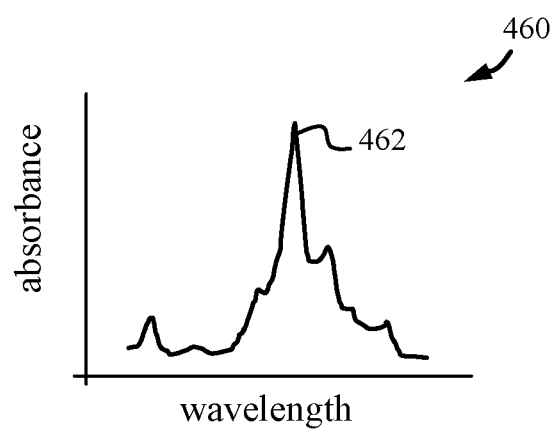
FIG. 4 shows a spectrum with distinct peaks.

Thus, in conventional FTIR (Fourier transform Infrared-Red) spectroscopy, pre-processing to provide a homogenized sample is generally required. Homogenized samples are sometimes made by powderising, followed by filtering the powder to a specific size and then forming compressed pellets of a standard weight from the powder. A spectrum 460 obtainable using conventional FTIR spectroscopy (such as illustrated in FIG. 4 for example) uses a homogenized sample so as to obtain distinct or sharp peaks 462, which can then be used for accurate identification of the sample. In conventional methods, pre-processing of the sample for the purpose of improving homogeneity or repeatability is usually deemed an essential procedure. Pre-processing or homogenisation may take the form of brewing the tea, or dissolving or extracting substances from the tea leaves. Pre-processing or homogenisation may take the form of pulverising the tea leaves to produce a powder having particles of similar size and shape. Other examples of homogenisation include microwave digestion, sub-boiling, distillation, etc. Such pre-processing or homogenisation processes are unfortunately destructive.

The system and method described in accordance with embodiments of the present disclosure are found to be suitable for non-destructive analysis of samples, even non-homogenized samples, such as tea leaves. The term "non-destructive" as used in this document includes analysing the sample "as is". In this example, this means that the tea leaves need not be pulverized or otherwise made into a powder form for the purpose of undergoing analysis. In this example, "non-destructive" can be understood to mean that the tea leaves need not be used or brewed to form a liquid for the purpose of undergoing analysis. In this example, it can also mean that the tea leaves need not have other substances (which may contaminate the sample) added as a substrate for the purpose of undergoing analysis. In this example, "non-destructive" can also mean that the tea leaves need not undergo pre-processing such as homogenisation, extraction, etc., before being received by the receptable. The sample can thus be described as "non-homogenized" or "heterogenous" in the sense that it need not undergo pre-processing to ensure or increase homogeneity throughout the whole of the sample. Understandably, these lists of examples of "non-destructive" and "non-homogenized" are not exhaustive, and they may vary when the sample includes different types of food products. The term "food" as used in this document includes food and beverage, and/or related products, whether directly or indirectly available from nature. Tea leaves and tea beverages are just a few examples of food. Understandably, such a system and method can come in particularly useful in situations where it is desirable to maintain the sample in the same form before and after the analysis. Without limiting applications, such a system and method can be useful when the sample is expensive, or when the sample is to be stored for future sale/consumption after carrying out the analysis. Without the need for pre-processing for the sake of performing the analysis, the overall time required for carrying out the analysis can be significantly reduced.

The system is thus configured to be "smart" enough to overcome challenges presented by non-homogeneity, and to use an overtone spectrum for accurate analysis. The system and method are also capable of reproducing the same results for the same sample in different rounds of analysis. It will be appreciated that the term "same results" is to be understood in a statistical sense. Repeatability or reproducibility can be useful for authentication, certification, or such validation purposes.

It is found that reproducibility is also achievable by embodiments of the present disclosure when different amounts of samples are used. The sample, and/or the articles constituting the sample, can thus be disposed randomly, that is, without specific geometric or spatial requirements relative to the receptable. The dried tea leaves can overlap one another partially or fully, in whichever orientation in three-dimensional space, to various depths, various thickness and/or various number of layers. This can come in useful when it is preferred not to transfer the sample out of its original container. It is not necessary to arrange the articles in a single layer in which none of the articles overlap or contact each other. This can come in useful when it is preferred not to subject the articles constituting the sample to excessive handling.

Figure 5:
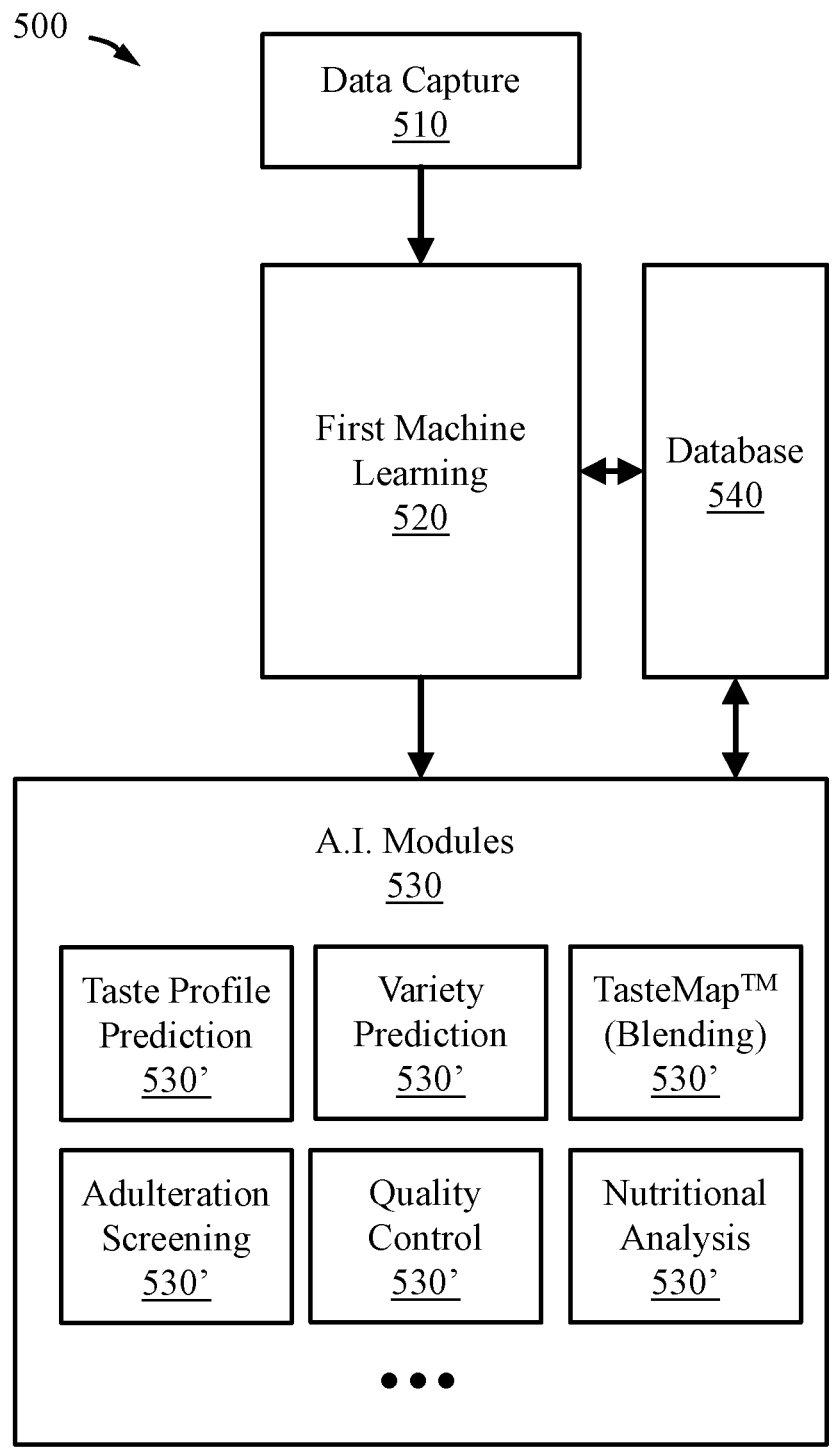
FIG. 5 is a schematic block diagram of a machine learning system according to one embodiment.

As shown in FIG. 1, the sensor is configured to output the captured data/signals (that is, the captured data based on the sample reflectance over a range of wavelengths detected) to the computing device 140 coupled to the sensor 120. The computing device may be coupled to a memory configured to store at least one machine learning algorithm executable by the computing device. Referring to a method 500 illustrated by the schematic block diagram of FIG. 5, the output of data capture 510 is fed to at least one first machine learning model 520. The output of the at least one first machine learning model may be input to at least one second machine learning model 530. The at least one second machine learning model 530 may be configured as one or more artificial intelligence modules 530', such as, a taste profile prediction module, a variety prediction module, a blend configuration module, an adulteration detection module, and a food grade/quality control module, a nutritional analysis module, etc. Training and/or trained data in a database 540 (in a memory/storage accessible by the computing device) may be applied by the at least one first machine learning model and/or the at least one second machine learning model. Various examples will be described below.

Figure 6:
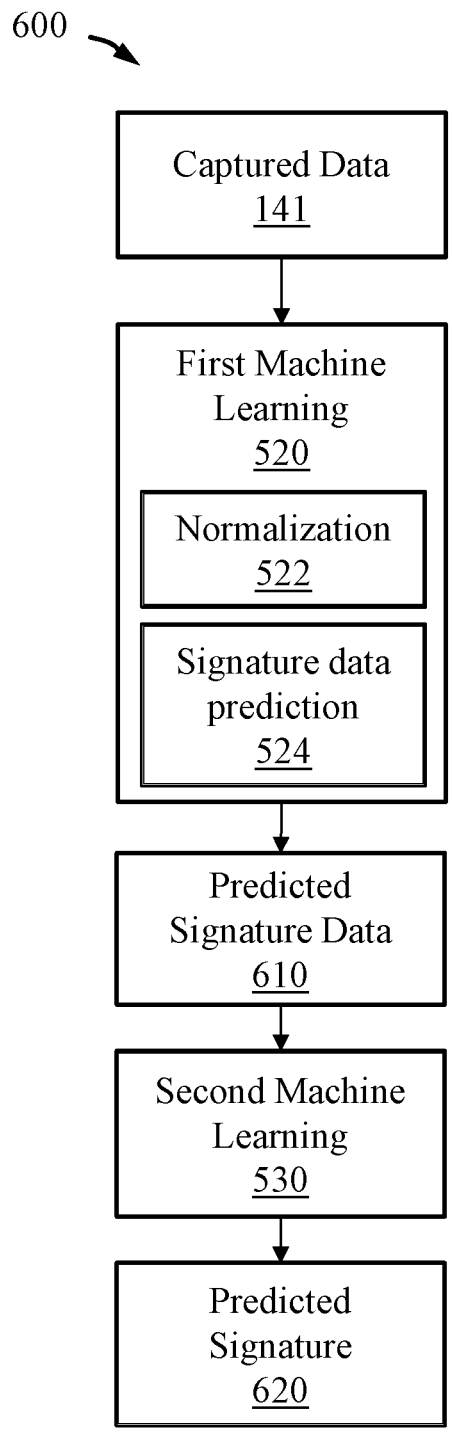
FIG. 6 is a flow diagram of a machine learning method according to one embodiment.

Referring now to FIG. 6 for a method 600 for predicting a signature of a food, captured data 141 (FIG. 1) from a three-dimensional or volumetric sampling space 300 (FIGS. 2A, 2B) is provided to at least one first machine learning model 520. The computing device 140 is configured to apply the at least one first machine learning model 520 to predict a signature data 610 based on the captured data 141. The captured data may be captured from one or more samples 200. One example of the captured data is sample reflectance. The captured data may be captured from one or more scans of the sample. The at least one first machine learning model may include normalization 522 of the captured data and dimensionality reduction. The dimensionality reduction technique may include principal component analysis, noise elimination, selection of variables, and/or application of weightages. The computing device may be configured to apply at least one first machine learning model selected from a plurality of first machine learning models to predict at least one facet of the signature data. The computing device may be configured to apply a plurality of selected first machine learning models to predict respective facets of the signature data. The at least one first machine learning model may be described as an unsupervised learning algorithm. The resulting predicted signature data 610 may be provided as an output of the system, stored in a database, and/or be fed to at least one second machine learning model 530. As another example, the first machine learning model may be configured as a supervised learning model, or a partial supervised learning model.

The at least one second machine learning model (also referred to here as an artificial intelligence (AI) module) 530 may be configured as a supervised machine learning model. The AI module may be one of a plurality of AI modules, and may be configured to apply logistic regression, naive Bayes, support vector machine, neural network, random forest, etc. The second machine learning model is configured to predict a signature 620 of the food based on the predicted signature data 610.

The computing device may be configured to apply the first machine learning model and/or the second machine learning model with training/trained data stored in a memory or a storage device, in the computing device or accessible via a network, such as in cloud storage. The training/trained data may be part of a database configured to store one or more supervised machine learning models and training/trained data. The database may store a plurality of signatures of a food, such as the taste signatures of the food.

Figure 7:
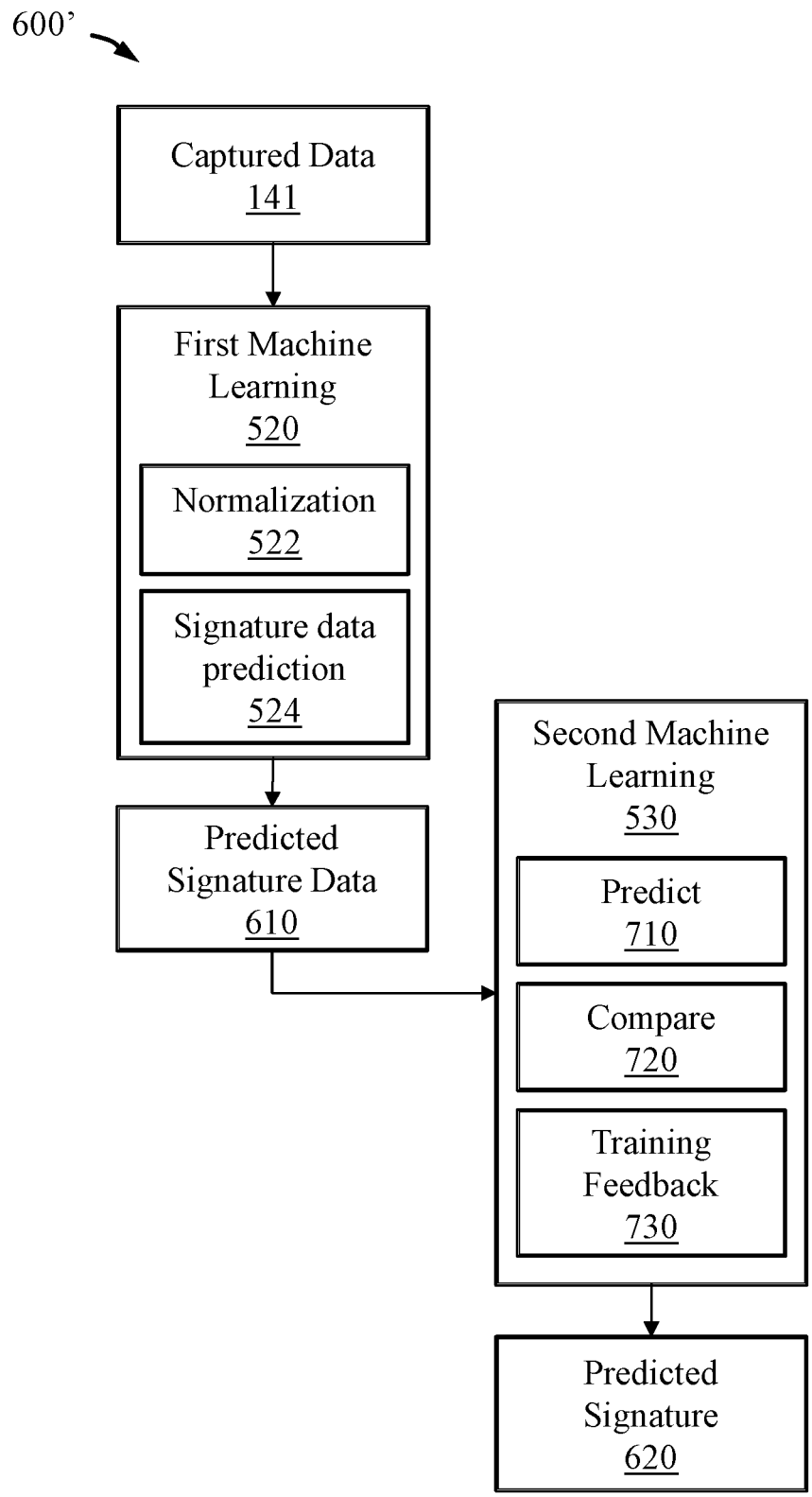
FIG. 7 illustrates a machine learning method according to another embodiment.

In one embodiment, as shown in FIG. 7, the method 600' may be performed using captured data from a known sample. The second machine learning model 530 may be a supervised machine learning algorithm configured to predict 710 a signature, and to compare 720 the prediction against known or training data from the database. Training feedback 730 is made so as to improve the second machine learning model.

Referring still to FIG. 7, the method 600' may also be performed using captured data from an unknown sample. The second machine learning model 530 may be a supervised machine learning algorithm configured to predict 710 and to output a signature 620.

Figure 8:
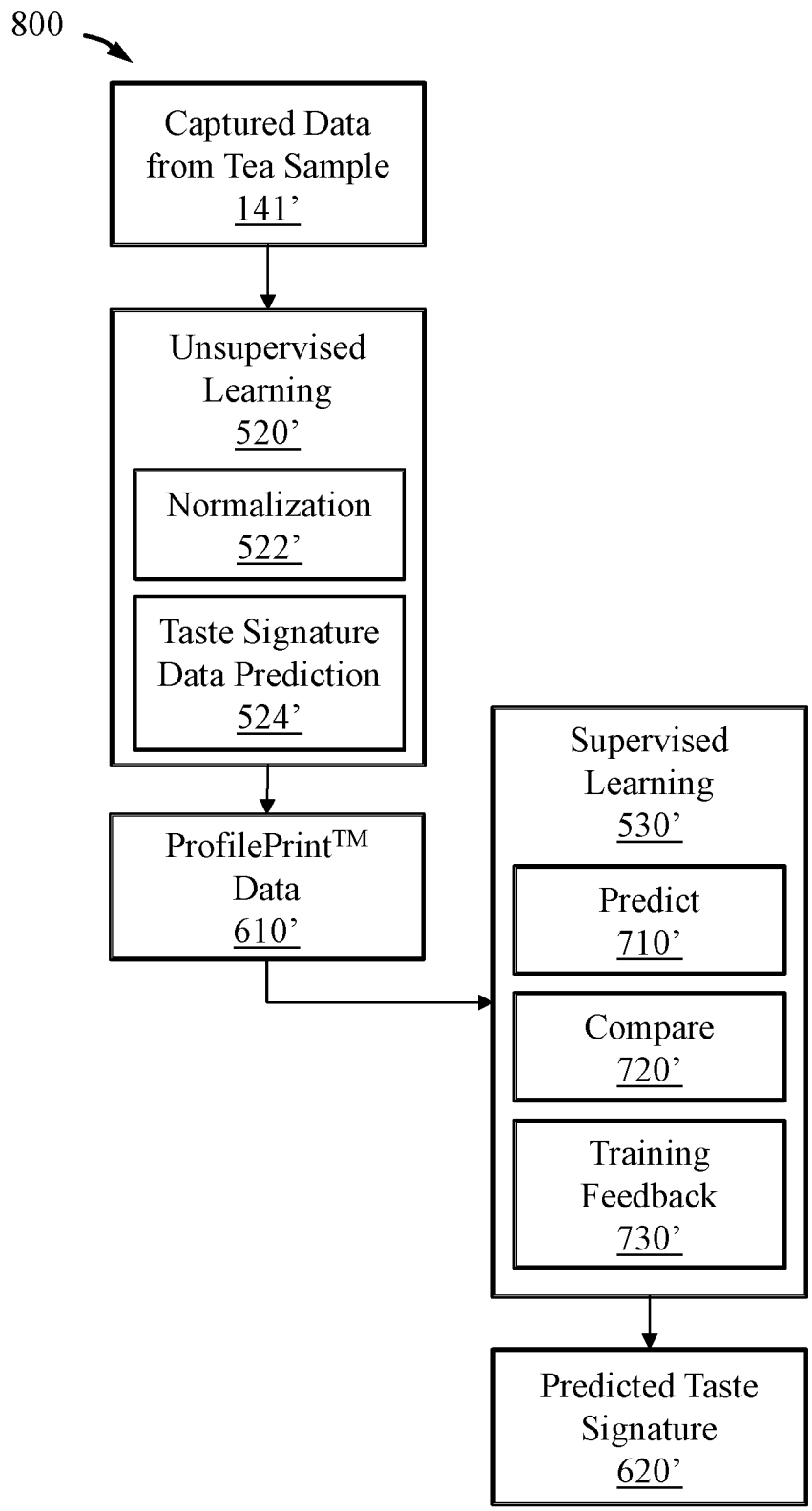
FIG. 8 illustrates the method of FIG. 7 as applied to predicting a signature of tea.

FIG. 8 shows an example where an embodiment of the present disclosure is applied to predicting a sensory experience associated with a tea, and more specifically to the taste of the tea. In some examples, the database is configured to include one or more training models, taste signatures, taste signature data, cultivars of tea, origins of tea varieties, tea classifications, etc. In some examples, the database is configured to store ProfilePrint™ data, a proprietary example of signature data. Examples of different types of signatures that can then be predicted using the signature data include: taste profile, cultivar, origin, classification, etc.

An example 800 of performing a signature prediction based on a sample of dried tea leaves will be described to aid understanding, without intention to be limiting. For example, signature data 610 of a known tea sample is obtained and together with a corresponding tea taster input, act as input into training one or more second machine learning models 530'. Continuing with the example of predicting the signature of tea leaves, a signature prediction module for tea may be built by collecting input (training data) from a tea taster, for example.

As an example, the second machine learning model is a signature prediction module 530'. In this example, the signature prediction uses vocabulary of a master tea taster to describe a tea brewed from dried tea leaves taken from the sample. It has been found that the system and method as described can predict a taste or flavour, similar to a human master tea taster. It can be appreciated that the signature prediction is a complex skill when performed by a human. Contrary to its name, "taste signature" is not simply about the flavour of the brewed tea as sensed by the taste buds on the tongue, and similarly, "taste profiling" as a method to acquire a "taste signature". A master tea taster would take into account the appearance, aroma, flavour, and mouth feel, of the tea. It therefore takes multiple descriptors to characterize a signature characteristic of a specific tea sample—for example, a taste signature may include descriptor "bright" and descriptor "smoky". It is said that there are at least 3,000 varieties of tea in the world. The Indian and Ceylon tea industry uses a vocabulary of about 35 descriptors, such as "bright", "pungent", "smoky", etc., to compose different taste signatures. In another example, a signature can be a combination of different degrees of descriptors, such as "sourness". "bitterness", "astringency", "sweetness", "richness", "Unami", "saltiness", "aftertaste-A", "aftertaste-B", etc. The same plant in a plantation may produce tea with different signature data from harvest to harvest. Therefore, simply matching the signature data would not produce consistently accurate taste predictions, and accurate taste predictions are required for correct prediction of the tea variety.

The second machine learning model may include models such as logistic regression, naive Bayes, support vector machines, artificial neural networks, and random forests. In this example, a predictive model is implemented to predict the presence or absence of each descriptor. Each descriptor may be predicted by a separate binary logistic regression model. Alternatively, a plurality of the descriptors may be predicted by a multivariate regression model. In binary logistic regression for example, one model may be implemented to predict the presence or absence of the "bright" descriptor. Another model may be implemented to predict the presence or absence of the "pungent" descriptor. In another example, the predictive model is configured to predict a value for each descriptor, in which the value is one out of a plurality of possible values.

Figure 9A:
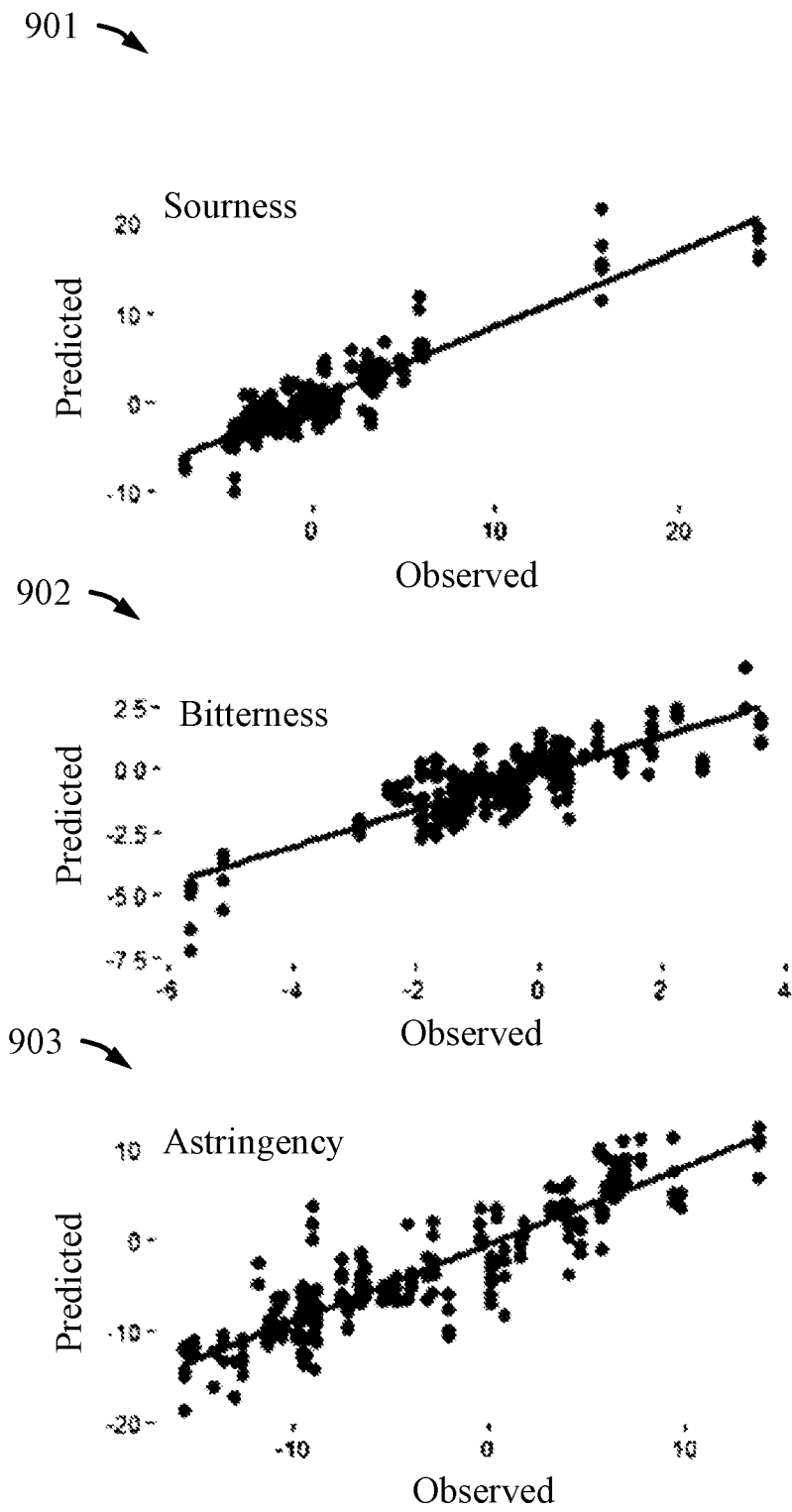
FIGS. 9A to 9C show examples of predicted descriptors.
Figure 9B:
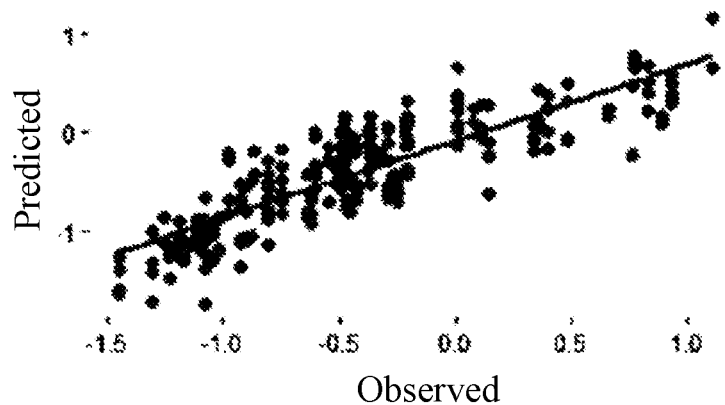
Figure 9B:
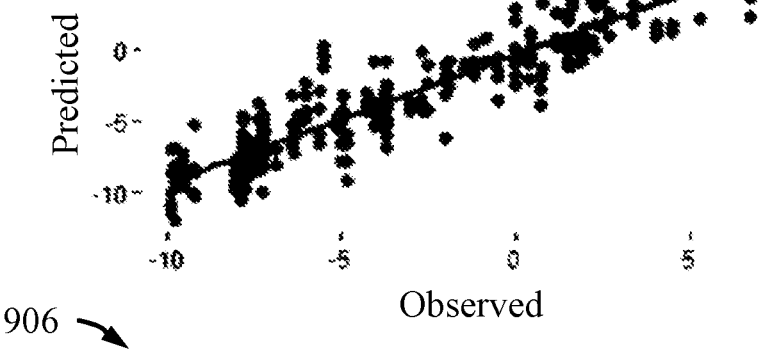
Figure 9B:
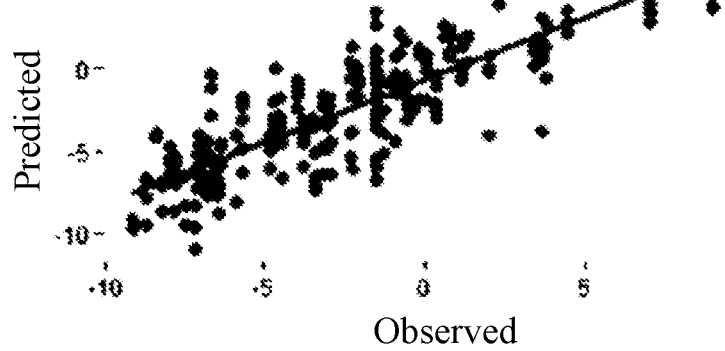
Figure 9C:
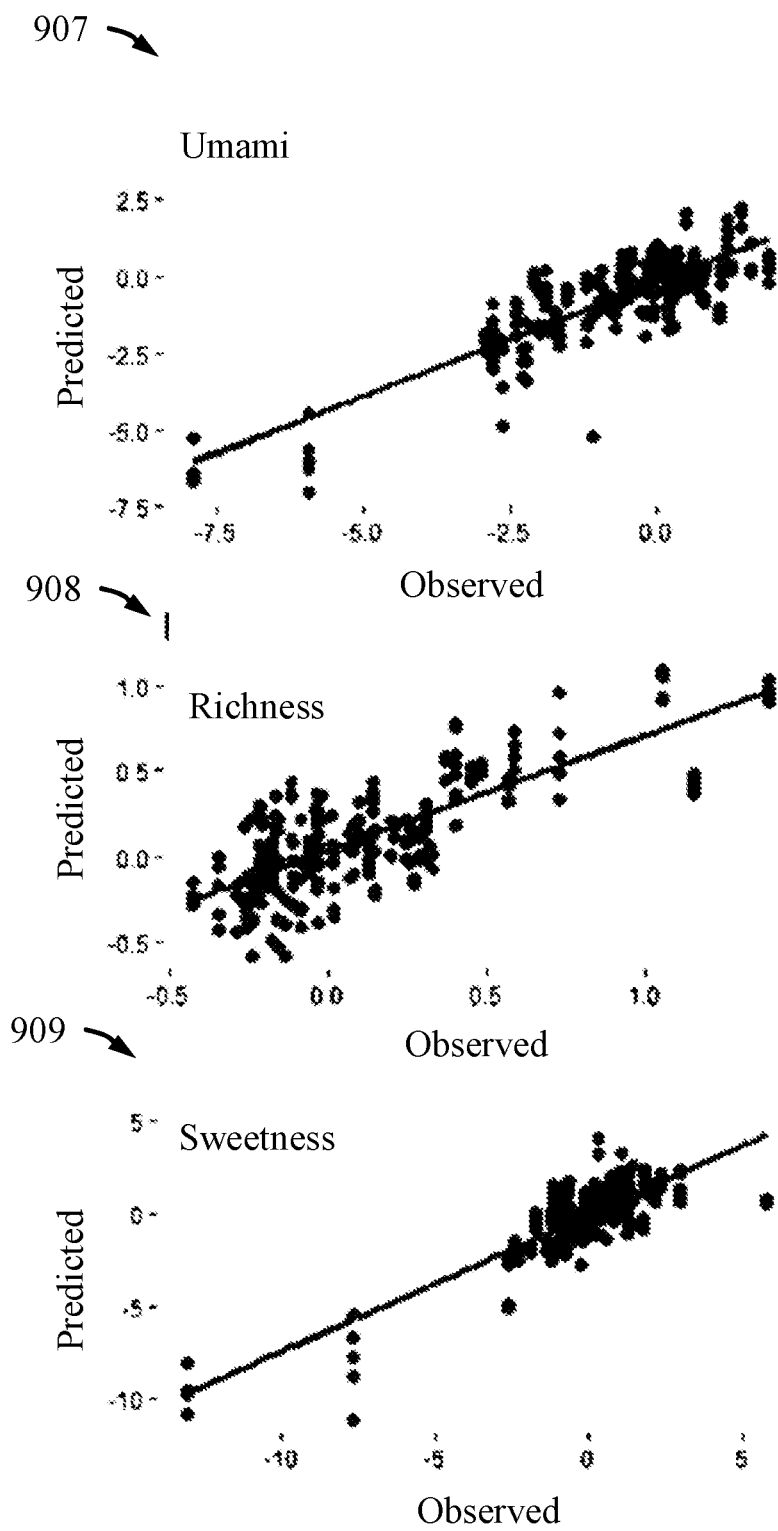
Figure 10:
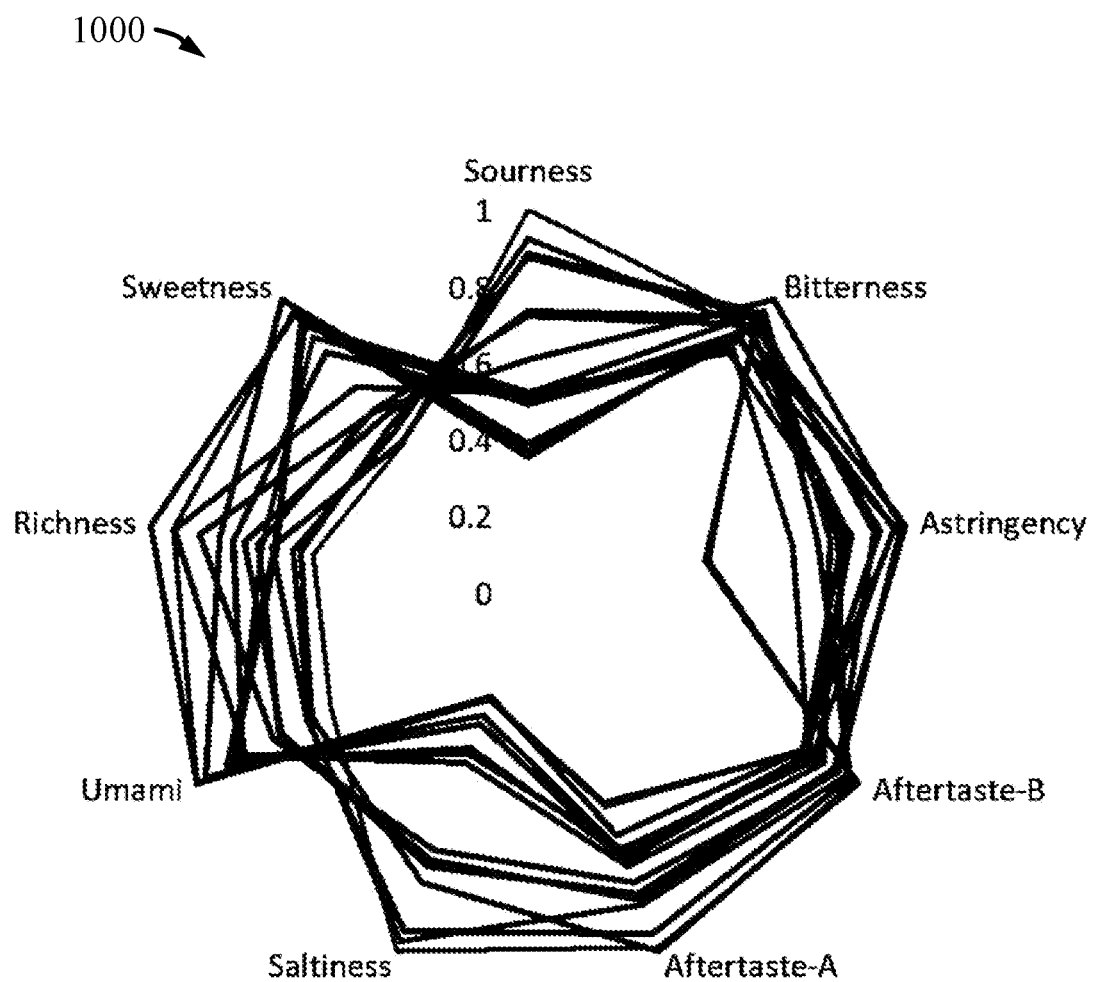
FIG. 10 show examples of predicted signatures.

The second machine learning model 530' may include multiple predictive models trained on training data, in which signatures are independent variables, and the human tea taster-defined taste characteristics are dependent variables. Referring to FIGS. 9A to 9C, the nine plots 901, 902, 903, 904, 905, 906, 907, 908, 909 show examples of predicted descriptors. A different predictive model may be applied to predict each descriptor. The second machine learning model in this example is configured to apply multiple predictive models to predict or arrive at a signature (combination of descriptors) for a tea sample. Examples of the predicted signatures of 15 different samples of tea are shown in FIG. 10. The signature prediction may be fed back to the supervised machine learning model to improve future predictions. The database is therefore configured to update the training data with new data, for subsequent use in the predictive model. FIG. 9A, FIG. 9B, and FIG. 9C additionally illustrate correlation between the predicted descriptor and the observed data. As the predictive models are fed with more data over time, the correlation between a predicted descriptor and the observed data is expected to improve.

Commonly recognized categories of tea include: black, dark, oolong, yellow green and white. As shown below in Table 1, tests to identify variants were performed on four different categories of tea using dried tea leaves using a system and method as described above.

TABLE 1

Accuracy in identifying tea variants within each category

| Tea Category | Captured Data | Signature Data |
|---|---|---|
| Black | 47 +/– 6% | 86 +/– 7% |
| Green | 89 +/– 8% | 94 +/– 8% |
| Dark | 73 +/– 16% | 81 +/– 12% |
| Oolong | 78 +/– 13% | 85 +/– 8% |

In each category of tea, there can be over 300 variants, having differences resulting from different cultivars, seasons, origins, etc. After machine learning has been applied to the captured data, the resulting signature data demonstrated an improvement in the accuracy of categorisation/classification by as much as 40% in the case of black tea. Therefore, in addition to predicting a sensory experience such as taste, embodiments of the present disclosure are also useful for categorisation or classification.

Further, the system and method according to embodiments of the present disclosure are found to be sufficiently accurate at the level of resolution required for predicting the different tea varieties within a category of tea. Table 2 below shows the results from conducting 100 blind tests per sample of Ceylon tea. The experiment used black tea (same category) of different varieties (Dimbula, Kandy, Ruhuna, Uva) from different regions of Sri Lanka. The signatures within each tea variety can exhibit a range of variations in the signature. For example, the Dimbula region produces teas with taste ranging from "full bodied" to "light and delicate". All 400 hundred tests performed correctly predicted the tea variety.

TABLE 2

Tea Variety Predictions Based on Dried Tea Leaves

| | Number of Tests Performed on Each Tea Variety | | | |
|---|---|---|---|---|
| Predictions | Dimbula | Kandy | Ruhuna | Uva |
| Dimbula | 100 | 0 | 0 | 0 |
| Kandy | 0 | 100 | 0 | 0 |
| Ruhuna | 0 | 0 | 100 | 0 |
| Uva | 0 | 0 | 0 | 100 |

TABLE 3

Predictions of Grades of Tea Based on Dried Tea Leaves

| | Grading of Dimbula Tea by Human Experts | | |
|---|---|---|---|
| Predictions | Grade 1 | Grade 2 | Grade 3 |
| Grade 1 | 100 | 0 | 0 |
| Grade 2 | 10 | 85 | 5 |
| Grade 3 | 4 | 10 | 86 |

The system and method according to embodiments of the present disclosure are found to be sufficiently accurate at a level of still finer resolution required for predicting the different grades of tea within a tea variety. Table 3 below shows the results from conducting 100 blind tests per sample of the Dimbula variety. Grading is conventionally performed by human experts or master tea tasters. The results are compared to how master tea tasters graded the same samples. Of the 100 tests performed by the system on a sample graded by human experts as "grade 1", the system accurately predicted in 100% of the tests that the sample is of "grade 1". Of the 100 tests performed by the system on a sample graded by human experts as "grade 2", the system accurately predicted in 85% of the tests that the sample is of "grade 2". Of the 100 tests performed by the system on a sample graded by human experts as "grade 3", the system accurately predicted in 86% of the tests that the sample is of "grade 3".

Thus, it can be appreciated that the embodiment of the present disclosure can provide richer information, such as cultivars, origins, provenances or tastes. Origins, cultivars, provenances or tastes are examples of richer information not obtainable from the inspection of visible characteristics of a food or food product. Origins, cultivars, provenances or tastes are examples of richer information not obtainable from the measurement of simple physical attributes such as weight or water content. Such levels of details were previously not obtainable using NIR and other micro-spectroscopy-based methods. In particular, previous to the present disclosure, such levels of details were not obtainable without the aid of trace element data, such as from atomic absorption spectrometry and inductively coupled plasma mass spectroscopy. It can be appreciated that atomic absorption spectrometry and inductively coupled plasma mass spectroscopy are destructive methods that produce line emission spectra.

Many food products, e.g., coffee, tea, rice, spices, whiskies, etc., on the market are actually blends or mixtures so as to deliver a consistent sensory experience for the consumer. For instance, a specific champagne product sold under the same brand name is actually a different mixture of different ingredients from year to year, otherwise, the taste of the product will vary from batch to batch in part owing to the intrinsic uniqueness of nature. The conventional method of blending involves having a human expert taster to select the ingredients to use in the blend, and to determine the proportion of each ingredient in the blend.

Embodiments of the present disclosure provides a non-destructive rapid system and method of predicting a blend composition. In this example, it is desired to replicate or mimic a taste of a known tea (target taste) by creating a blend using tea selected from a plurality of ingredients. The ingredients may differ from one another in terms of harvests, geographical origins, suppliers, batches, sources, varieties, and/or grades, etc.

A database of signatures is stored in a storage (e.g., local server, cloud storage, etc) accessible by the computing device 140, in which the computing device is configured to predict blend composition according to an embodiment of the present disclosure. Part of the database may have been previously developed by human master tea tasters using industry-standard vocabulary descriptors to describe the taste of tea. Additionally, at least part of the database may be developed using an artificial intelligence-based system including a first machine learning model and a second machine learning model. The database may include a plurality of signatures, in which each signature is a predicted combination of a plurality of descriptors, and in which each descriptor is associated with a predicted binary variable. Each of such signatures may be referred to as a TasteMap™ of a taste of a particular tea variety or blend. If the target signature is not available in the database of signatures, a signature may be predicted for the target taste and stored in the database, using the system and method described above. If the signature of any ingredient is not found in the database of signatures, a signature for that ingredient may be predicted and stored in the database.

For example, using a system of FIG. 1, captured data from at least one sample of a first ingredient can be obtained. The computing device can be configured to input the captured data into the first machine learning model. The first machine learning model is configured to normalize the captured data. The first machine learning model is configured to subject the normalized captured data to dimensionality reduction. The first machine learning model is configured to predict at least one facet of a signature data, in which the at least one facet corresponds to at least one predictively selected wavelength from the overtone spectrum. In one example, dimensionality reduction includes principal component analysis to determine discrete wavelength values within the VIS-NIR wavelength range. The determined discrete wavelength values can be described as an overtone spectrum with inadequately distinctive features when compared to other spectrometer readings. The first machine learning model is configured to use the determined discrete wavelength values to predict a signature data (also referred to as a ProfilePrint™ data) for the first ingredient. As an example, the signature data is characteristic of a taste of the tea/food. In another example, the signature data is characteristic of a composition of the tea/food.

In other words, the detector is coupled to the output port to receive a component of the light. The detector is configured to convert the component of the light into captured data. The captured data is characterized by an overtone spectrum at least partially in a visible-to-near infra-red wavelength range. The computing device is coupled to the detector to receive the captured data. The computing device is configured to apply a plurality of first machine learning models to the captured data to predict a plurality of signature data, and to apply a plurality of second machine learning models in which the plurality of signature data is used to predict a plurality of descriptors. The plurality of descriptors can be used to form the signature of the tea. Each of the plurality of the second machine learning models may be configured to predict a respective one of the plurality of descriptors.

This process may be iteratively performed to predict a signature for each of the ingredient. The signature predicted can be stored in a database forming part of training data for one or more machine learning models. This process may therefore be iteratively performed over time to improve a signature data prediction for the ingredient. The machine learning models may be trained on the signatures as independent variables. The machine learning models may be trained on human tea taster-defined descriptors (or characteristics) as dependent variables. The descriptors used may be in the form of words or symbols understood by a user.

In one example, multiple machine learning models are provided to predict one signature. In one example, the second machine learning model is configured to predict the presence or the absence of a single descriptor. In one example, the second machine learning model is configured to predict the presence (e.g., "bright") or the absence (e.g., "not bright") of a descriptor in a signature. In one example, the second machine learning model is configured to apply different machine learning models for each of a plurality of descriptors.

as few as two ingredients may be used to reproduce the target taste of the Target Blend, although the Target Blend has traditionally been a blend of five ingredients. In this example, the second machine learning model predicted Blend A as consisting of 61.3% of Tea 3 mixed (or blended) with 38.7% of Tea 5.

The second machine learning model may be configured to predict more than one blend. For example, the same machine learning model may be configured to also predict a second predicted blend B which consists of 44.9% of Tea 3 and 55.1% of Tea 5, as well as a third predicted blend C. The predicted blend C consists of 36.7% of Tea 3 and 63.3% of Tea 5. Thus, the computing device can be configured to apply the second machine learning model to a signature to predict a blend of at least two ingredients, where the blend is intended to have a taste associated with the tea.

The second machine learning model may be configured to provide a numerical indicator of the percentage difference between each predicted blend and the target blend. According to the numerical indicators in Table 4, of the three predicted blends, Blend B and Blend C are more likely to match the taste of the Target Blend than Blend A. When human tasters (among whom included a tea taster, a master tea taster, and senior management in the tea industry) were brought in to verify the predicted results, Blend B and Blend C were found by all to match the taste of the Target Blend. This suggests that, in the event that one or more of the

TABLE 4

Predicted Blends

| Blend | Composition (%) | | | | | % Difference from Target | Cost Savings |
| | Tea 1 $$$ | Tea 2 $$$$$ | Tea 3 $ | Tea 4 $$$$ | Tea 5 $$ | | |
| --- | --- | --- | --- | --- | --- | --- | --- |
| A | 0.00% | 0.0% | 61.3% | 0.0% | 38.7% | 10.00% | 5.34% |
| B | 0.00% | 0.0% | 44.9% | 0.0% | 55.1% | 5.00% | 4.37% |
| C | 0.00% | 0.0% | 36.7% | 0.0% | 63.3% | 2.50% | 3.90% |
| Target | 20.0% | 20.0% | 20.0% | 20.0% | 20.0% | 0% | 0.00% |

A signature (e.g., TasteMap™) may be used in predicting one or more blends. Table 4 is a table including at least one possible substitute blend for a Target Blend. The second machine learning model has predicted three possible blends (Blend A, Blend B, and Blend C) that may be perceived by consumers as having a similar taste experience as the Target Blend. The second machine learning model is configured to apply a machine learning algorithm to predict a blend that may produce an overall taste experience similar to that of the target taste experience. The degree of similarity improves over iterative training, and as the database of signatures develops. The second machine learning model is configured to predict one or more ingredients to be selected.

In this case, the Target Blend is a mixture of five ingredients in equal proportions, that is, 20% Tea 1, 20% Tea 2, 20% Tea 3, 20% Tea 4, and 20% Tea 5. A signature (target signature) is first predicted for the Target Blend. The five ingredients (Tea 1, Tea 2, Tea 3, Tea 4, and Tea 5) may differ from one another only in terms of the grade of tea leaves. The five ingredients may differ from one another in terms of the source or origin.

It can be understood that having five ingredients is just an example to aid understanding; more than five or fewer than five ingredients may be involved in other examples. For example, the results of the predictions show surprisingly that ingredients Tea 1, Tea 2 or Tea 3 are not available, the food product manufacturer has the option of using the available ingredients to provide the consumer with a consistent taste. The second machine learning model can also be a tool to help the food product manufacturer segment the markets, for example, into a general consumer market segment (Blend B) and another market segment catering to the tea aficionado (Blend C).

The second machine learning model may be further configured to take into consideration, in addition to the target signature, one or more user-defined parameters in predicting the ingredients to be selected. Examples of user-defined parameters include the amount or the proportion of a chosen ingredient to be used in a blend, the price or cost-related data of the ingredients. In Table 4, the relative cost of the ingredients is symbolically represented simply for illustration purposes. Based on the cost of the ingredients and the predicted blends, the cost savings of switching blends can be calculated by the computing device. The second machine learning model may be configured to take into consideration such user-defined parameters as part of the predictive learning to enable more complex decision making.

To illustrate that embodiments of the present disclosure are applicable to other food products besides tea, an example involving edible bird's nest samples will be described. Four samples (EBN A, EBN F, EBN K, and EBN B) were provided. Each sample includes solid articles of various sizes, ranging in size from dust particle size to pieces larger than 10 millimetres (mm) in length or width. Each sample was scanned five times using a system of FIG. 1. The contents were gently disturbed between successive scans. Human visual inspection of the captured data (before it is input to the first machine learning model) failed to identify any distinctive patterns as the captured data seems similar and consistent across all the four samples. The captured data was fed to the first machine learning model to predict signature data (ProfilePrint™ data) for each of the samples. The signature data is subject to a predictive algorithm, and the results are shown below in Table 5. Based on the predicted signature data, pure samples of authentic edible bird's nest (EBN A) can be differentiated from the adulterated samples, even if the adulteration is not visible to the naked eye, or not visible from the captured data. EBN F and EBN K were adulterated with substance X and substance Y respectively. EBN B were associated with different predicted results, corresponding to was adulterated with a heavy dosage of substance X. This is reflected in Table 5, demonstrating that the quality of the other samples and a measure of the quality (e.g., purity) can be correctly predicted based on the predicted signature data.

TABLE 5

Predictions of Edible Bird's Nest

| Sample | EBN A | EBN F | EBN K | EBN B |
| --- | --- | --- | --- | --- |
| EBN A | 100.00% | 79.93% | 81.71% | 58.82% |
| EBN F | 79.93% | 100.00% | 92.94% | 74.86% |
| EBN K | 81.71% | 92.940% | 100% | 80.27% |
| EBN B | 58.82% | 74.86% | 80.27% | 100% |

The experiment shows that the system is capable of predicting signature data from overtone spectrum of materials other than tea leaves. This also demonstrates that the system can be used for screening or adulteration detection of various substances, and specifically, of food or food-related substances.

Figure 11:
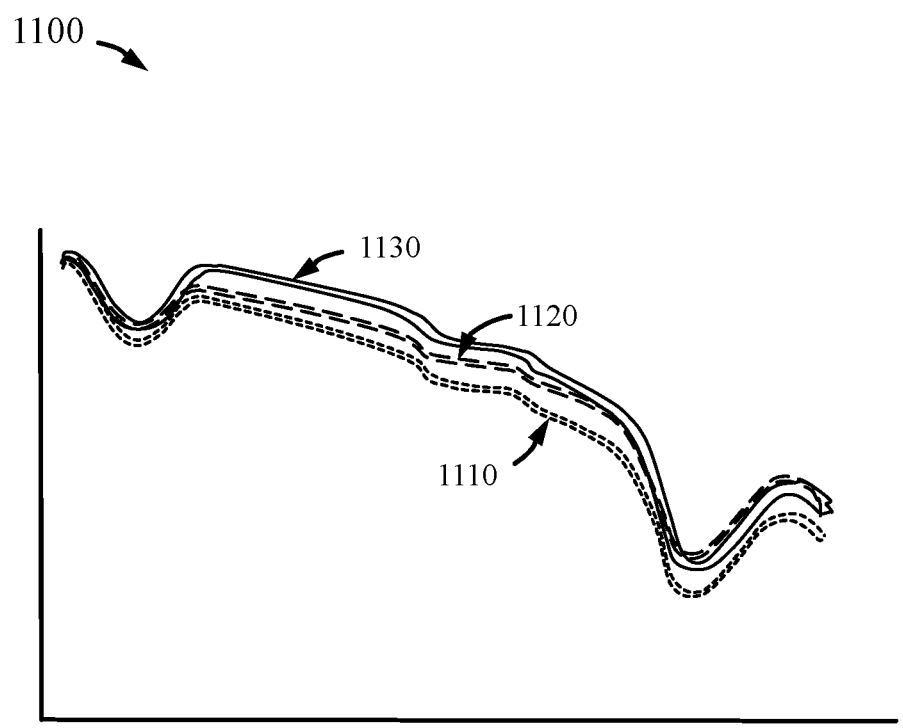
FIG. 11 illustrates examples of overtone spectra for samples not in the solid state.

In addition to samples in a solid state, samples in the liquid state have also been found suitable for use with embodiments of the present disclosure. FIG. 11 shows the overtone spectra (or captured data) 1000 for milk samples obtained using an embodiment of the system of FIG. 1. The data captured for a refrigerated sample of milk is spread over a region bounded by a dotted line 1110. The data captured for a milk sample after different lengths of time unrefrigerated are also shown by regions bounded by a dashed line 1120 and a solid line 1130 respectively. It can be appreciated that the overtone spectra do not have distinct peaks. It was found that the system was able to predict signature data from the captured data for prediction and/or meaningful analysis, even though the captured data at any one wavelength may spread over a range of reflectance values. In this case, it was also demonstrated that different volumes of the samples (or the depth of the milk in the cup) need not be a constant for all the scans. This greatly simplifies the process of data capture for the non-expert user, and thus increases the accessibility to such technology in regions where laboratory resources are scarce or prohibitively expensive. From the captured data for the milk samples, signature data is predicted. The first machine learning model may be trained on the signature data thus captured to provide a non-destructive rapid determination of a quality of the milk, for example, the freshness of the milk, etc.

This disclosure has been presented for purposes of illustration and description but is not intended to be exhaustive or limiting. Many modifications and variations will be apparent to those of ordinary skill in the art. The example embodiments have been chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one of ordinary skill in the art without departing from the scope of the disclosure.

The invention claimed is:

1. A portable apparatus configured to perform non-destructive taste profiling of a food, the portable apparatus comprising:
   a receptacle configured to move a sample of the food in a volumetric sampling space, in which the sample includes the food in a non-homogenized form;
   a source configured to direct light towards the volumetric sampling space;
   an optical device having an input port and an output port, the input port being configured to sense reflectance from at least a part of the sample in the volumetric sampling space, the reflectance characterized by visible-to-near infra-red light, the optical device being configured to output a component of the reflectance through the output port; and
   a detector coupled to the output port, the detector being configured to convert the component of the reflectance into captured data, the captured data being characterized by an overtone spectrum of a measure of the reflectance, the overtone spectrum characterized by gradual changes in intensity over a range of wavelengths; and
   a computing device coupled to the detector, the computing device being configured to:
   execute at least one first machine learning model using the captured data as input, the at least first machine learning model being configured to:
      predict at least one facet corresponding to at least one selected wavelength from the overtone spectrum; and
      predict a signature data based on a plurality of the at least one facet, wherein the signature data is characteristic of a taste of the food, and
   execute at least one second machine learning model using the signature data as input, the at least one second machine learning model being configured to:
      predict at least one descriptor; and
      predict a signature characteristic of the food using the at least one descriptor, wherein the signature comprises a cultivar or an origin of the food.

2. The portable apparatus of claim 1, wherein the computing device is further configured to compare the signature of the food against training data in a database to improve the at least one second machine learning model.

3. The portable apparatus of claim 1, wherein the signature is an independent variable, and wherein the at least one descriptor is a dependent variable.

4. The portable apparatus of claim 1, wherein the at least one first machine learning model includes an unsupervised machine learning model, and wherein the at least one second machine learning model includes a supervised machine learning model.

5. The portable apparatus of claim 1, wherein the receptacle is configured to be rotatable, and wherein the computing device is further configured to output the signature in about 5 seconds from initiating rotation of the receptacle.

6. The portable apparatus of claim 1, wherein the at least one second machine learning model is configured to predict a blend intended to have a taste associated with the food, and wherein the blend has a composition of ingredients different from a composition of the food.

7. The portable apparatus of claim 1, wherein the at least one second machine learning model is configured to predict a variant and/or a category of the food.

8. The portable apparatus of claim 1, wherein the receptable is configured to move relative to the source and/or the optical device to define the volumetric sampling space.

9. The portable apparatus of claim 1, wherein the optical device is configured to remove spatial information from the reflectance.

10. A system for non-destructive taste profiling of a sample of a food, the system comprising:
a receptacle configured to move the sample in a path so as to intersect a volumetric sampling space, the sample being in a non-homogenized form;
a sensor configured to sense reflectance from at least a part of the sample in the volumetric sampling space, the reflectance characterized by visible-to-near infra-red light, the sensor being configured to output a component of the reflectance as captured data, the captured data being characterised by an overtone spectrum of a measure of the reflectance, the overtone spectrum characterized by gradual changes in intensity over a range of wavelengths; and
a computing device configured to apply at least one first machine learning model to the captured data to:
predictively determine selected wavelengths from the range of wavelengths;
predict at least one facet corresponding to the selected wavelengths; and provide a signature data using the at least one facet, wherein the signature data is characteristic of a taste of the food,
wherein the computing device is further configured to apply at least one second machine learning model to the signature data to predict at least one descriptor; and provide a signature of the sample using the at least one descriptor, wherein the signature comprises a cultivar or an origin of the food.

11. The system of claim 10, wherein the receptable is configured to move relative to the source and/or the optical device to define the volumetric sampling space.

12. The system of claim 11, wherein the sensor is configured to remove spatial information from the reflectance.

13. The system of claim 10, further configured to compare the signature of the food against training data in a database to improve the at least one second machine learning model.

14. The system of claim 10, wherein the computing device is further configured to apply the at least one second machine learning model to the signature data to predict a blend intended to have a taste associated with the sample, wherein the blend has a composition of ingredients different from a composition of the sample.

15. The system of claim 10, wherein the computing device is configured to apply the at least one second machine learning model to the signature data to predict a variant and/or a category of the sample.

16. The system of claim 10, wherein the computing device is configured to apply the at least one second machine learning model to the signature data to predict a degree of purity of the sample.

17. A system, comprising:
memory storing instructions; and
a processor coupled to the memory and configured to process the stored instructions to implement:
a module configured to perform a method of non-destructive taste profiling of a sample of a food, the method comprising:
providing captured data to a computing device, the captured data being characterised by an overtone spectrum of a measure of a reflectance, the reflectance characterized by visible-to-near infra-red light, the overtone spectrum characterized by gradual changes in intensity over a range of wavelengths, wherein the reflectance is sensed from at least a part of the sample in a volumetric sampling space, the sample including non-homogenized food;
predicting at least one facet by applying at least one first machine learning model to the captured data, wherein the at least one facet corresponds to at least one selected wavelength predictively determined from the range of wavelengths;
using the at least one facet to provide a signature data characteristic of the sample, wherein the signature data is characteristic of a taste of the food;
applying at least one second machine learning model to the signature data, wherein the at least one second machine learning model is configured to:
predict at least one descriptor; and
provide the signature of the food using the at least one descriptor, wherein the signature comprises a cultivar or an origin of the food.

18. The system of claim 17, wherein the method further comprising: comparing the signature of the food against training data in a database to improve the at least one second machine learning model.

19. The system of claim 17, wherein the method further comprising: predicting a blend intended to have a taste associated with the food, wherein the blend has a composition of ingredients different from a composition of the food.

20. The system of claim 17, wherein the second machine learning model is at least one selected from a group consisting of: a taste profile prediction module, a variety prediction module, a blend configuration module, an adulteration detection module, and a food grade/quality control module, and a nutritional analysis module.

* * * * *